(12) United States Patent
Luo et al.

(10) Patent No.: US 11,961,237 B2
(45) Date of Patent: Apr. 16, 2024

(54) FOREGROUND DATA GENERATION METHOD AND METHOD FOR APPLYING SAME, RELATED APPARATUS, AND SYSTEM

(71) Applicant: Tencent Technology (Shenzhen) Company Limited, Shenzhen (CN)

(72) Inventors: Jingmin Luo, Shenzhen (CN); Xiaolong Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 445 days.

(21) Appl. No.: 17/330,268

(22) Filed: May 25, 2021

(65) Prior Publication Data

US 2021/0279888 A1  Sep. 9, 2021

Related U.S. Application Data

(63) Continuation of application No. PCT/CN2020/079621, filed on Mar. 17, 2020.

(30) Foreign Application Priority Data

Apr. 12, 2019  (CN) .......................... 201910292962.1

(51) Int. Cl.
*G06T 7/194* (2017.01)
*G06F 18/214* (2023.01)
(Continued)

(52) U.S. Cl.
CPC .............. *G06T 7/11* (2017.01); *G06F 18/214* (2023.01); *G06T 5/002* (2013.01); *G06T 7/194* (2017.01);
(Continued)

(58) Field of Classification Search
CPC . G06T 7/11; G06T 7/194; G06T 5/002; G06T 2207/20081; G06V 10/28; G06V 40/20; G06V 10/34; G06F 18/214
See application file for complete search history.

(56) References Cited

U.S. PATENT DOCUMENTS 7,801,330 B2* 9/2010 Zhang ..................... G06T 7/215
                                                            348/169
9,158,985 B2* 10/2015 Li .............................. G06T 7/11
(Continued)

FOREIGN PATENT DOCUMENTS

CN  102364944 A  2/2012
CN  102982313 A  3/2013
(Continued)

OTHER PUBLICATIONS

Tencent Technology, ISR, PCT/CN2020/079621, Jun. 22, 2020, 2 pgs.
(Continued)

*Primary Examiner* — Gregory M Desire
(74) *Attorney, Agent, or Firm* — Morgan, Lewis & Bockius LLP

(57) ABSTRACT

Embodiments of this application disclose a foreground data generation method performed at a computer device. The method includes: obtaining a background image and a target image, the target image containing a target object and a background; removing the background from the target image according to the background image and the target image, to obtain initial foreground data of the target object in the target image; obtaining certain foreground data and uncertain data from the initial foreground data, wherein the uncertain data represents data whose value is between the certain foreground data and background data corresponding to the background; and segmenting the certain foreground
(Continued)

data from the uncertain data, to obtain target foreground data of the target object in the target image.

20 Claims, 16 Drawing Sheets

(51) Int. Cl.
*G06K 9/62* (2022.01)
*G06T 5/00* (2006.01)
*G06T 7/11* (2017.01)
*G06V 10/28* (2022.01)
*G06V 10/34* (2022.01)
*G06V 40/20* (2022.01)

(52) U.S. Cl.
CPC .............. *G06V 10/28* (2022.01); *G06V 10/34* (2022.01); *G06V 40/20* (2022.01); *G06T 2207/20081* (2013.01)

(56) References Cited

U.S. PATENT DOCUMENTS

| | | | |
|---|---|---|---|
| 9,524,558 B2* | 12/2016 | Ashani | G06T 7/194 |
| 10,825,185 B2* | 11/2020 | Kim | G06T 7/174 |
| 10,896,323 B2* | 1/2021 | Chen | G06F 18/21 |
| 2011/0164185 A1 | 7/2011 | Park et al. | |
| 2011/0164823 A1* | 7/2011 | Park | G06T 7/194 |
| | | | 382/199 |

FOREIGN PATENT DOCUMENTS

| | | |
|---|---|---|
| CN | 103039066 A | 4/2013 |
| CN | 104156729 A | 11/2014 |
| CN | 104658009 A | 5/2015 |
| CN | 105139415 A | 12/2015 |
| CN | 105184787 A | 12/2015 |
| CN | 105913082 A | 8/2016 |
| CN | 107507221 A | 12/2017 |
| CN | 107610149 A | 1/2018 |
| CN | 107943837 A | 4/2018 |
| CN | 108230252 A | 6/2018 |
| CN | 108447068 A | 8/2018 |
| CN | 108537815 A | 9/2018 |
| CN | 108564057 A | 9/2018 |
| CN | 109146830 A | 1/2019 |
| CN | 109241973 A | 1/2019 |
| CN | 109544571 A | 3/2019 |
| CN | 110033463 A | 7/2019 |

OTHER PUBLICATIONS

Tencent Technology, WO, PCT/CN2020/079621, Jun. 22, 2020, 5 pgs.
Tencent Technology, IPRP, PCT/CN2020/079621, Sep. 28, 2021, 6 pgs.

* cited by examiner

FOREGROUND DATA GENERATION METHOD AND METHOD FOR APPLYING SAME, RELATED APPARATUS, AND SYSTEM

CROSS-REFERENCE TO RELATED APPLICATIONS

This application is a continuation application of PCT Patent Application No. PCT/CN2020/079621, entitled "PROSPECT DATA GENERATION AND APPLICATION METHODS, RELATED APPARATUS AND SYSTEM" filed on Mar. 17, 2020, which claims priority to Chinese Patent Application No. 201910292962.1, filed with the State Intellectual Property Office of the People's Republic of China on Apr. 12, 2019, and entitled "FOREGROUND DATA GENERATION METHOD AND METHOD FOR APPLYING SAME, RELATED APPARATUS, AND SYSTEM", all of which are incorporated herein by reference in their entirety.

FIELD OF THE TECHNOLOGY

This application relates to the field of image processing technologies, and in particular, to a foreground data generation method and a method for applying same, a related apparatus, and a system.

BACKGROUND OF THE DISCLOSURE

Two relatively common portrait data generation methods are as follows. In the first method, points surrounding a portrait in an image are manually annotated, so that a plurality of key points form a polygon, to construct initial portrait data of the portrait. The initial portrait data is also referred to as an initial mask of the portrait. In the second method, an inputted image is annotated by using an existing deep learning model, and masks of annotated portraits are then manually screened and by using a program, to obtain relatively accurate portrait data.

SUMMARY

Embodiments of this application provide a foreground data generation method and a method for applying same, a related apparatus, and a system, to quickly separate foreground data from an image without manual participation.

According to an aspect, an embodiment of this application provides a foreground data generation method, performed by a computer device, the method including:
  obtaining a background image and a target image, the target image containing a target object and a background;
  removing the background from the target image according to the background image and the target image, to obtain initial foreground data of the target object in the target image;
  obtaining certain foreground data and uncertain data from the initial foreground data, wherein the uncertain data represents data whose value is between the certain foreground data and background data corresponding to the background; and
  segmenting the certain foreground data from the uncertain data, to obtain target foreground data of the target object in the target image.

According to an aspect, an embodiment of this application provides a method for training a background segmentation model, performed by a computer device, the method including:
  obtaining a target image sample set constructed based on the foreground data generation method provided in the embodiments of this application; and
  training a background segmentation model by using the target image sample set.

According to an aspect, an embodiment of this application provides an image processing method, performed by a computer device, the method including:
  acquiring a to-be-processed target image;
  separating foreground data and background data from the to-be-processed target image by using a background segmentation model trained by using the method for training a background segmentation model provided in the embodiments of this application; and
  separately rendering the foreground data and the background data of the to-be-processed target image.

According to an aspect, an embodiment of this application provides a foreground data generation apparatus, including:
  a first obtaining unit, configured to obtain a background image and a target image, the target image containing a target object and a background;
  a background removal unit, configured to remove the background from the target image according to the background image and the target image, to obtain initial foreground data of the target object in the target image;
  a data processing unit, configured to obtain certain foreground data and uncertain data from the initial foreground data, wherein the uncertain data represents data whose value is between the certain foreground data and background data corresponding to the background; and
  a data obtaining unit, configured to segment the certain foreground data from the uncertain data, to obtain target foreground data of the target object in the target image.

According to an aspect, an embodiment of this application provides an apparatus for training a background segmentation model, including:
  an obtaining unit, configured to obtain a target image sample set constructed based on the foreground data generation method provided in the embodiments of this application; and
  a model training unit, configured to train a background segmentation model by using the target image sample set.

According to an aspect, an embodiment of this application provides an image processing apparatus, including:
  an acquisition unit, configured to acquire a to-be-processed target image;
  a background segmentation unit, configured to separate foreground data and background data from the to-be-processed target image by using a background segmentation model trained by using the method for training a background segmentation model provided in the embodiments of this application; and
  a rendering unit, configured to separately render the foreground data and the background data of the to-be-processed target image.

According to an aspect, an embodiment of this application provides an image processing system, including at least: an image acquisition device, a background segmentation device, and an image rendering device,
  the image acquisition device being configured to acquire a to-be-processed target image;

the background segmentation device being configured to separate foreground data and background data from the to-be-processed target image by using a background segmentation model trained by using the method for training a background segmentation model provided in the embodiments of this application; and the image rendering device being configured to separately render the foreground data and the background data of the to-be-processed target image.

According to an aspect, an embodiment of this application provides a non-transitory computer-readable storage medium, storing computer-executable instructions, the computer-executable instructions, when executed by a processor of a computer device, causing the computer device to perform the foreground data generation method provided in the embodiments of this application, or perform the method for training a background segmentation model provided in the embodiments of this application, or perform the image processing method provided in the embodiments of this application.

According to an aspect, an embodiment of this application provides computer device, including a memory, a processor, and a plurality of computer programs stored in the memory that, when executed by the processor, cause the computer device to, implement the foreground data generation method provided in the embodiments of this application, or implement the method for training a background segmentation model provided in the embodiments of this application, or implement the image processing method provided in the embodiments of this application.

Other features and advantages of this application will be described in the subsequent specification, and partially become apparent from the specification, or be understood by implementing this application. Objectives and other advantages of this application may be implemented and obtained by using structures particularly mentioned in the specification, the claims, and the accompanying drawings.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

A foreground data generation method and a method for applying same, a related apparatus, and a system provided in the embodiments of this application are used to quickly separate foreground data from an image without manual participation.

The following describes the exemplary embodiments of the application with reference to the accompanying drawings of the specification. It is to be understood that the exemplary embodiments described herein are merely used for illustrating and explaining this application, but are not intended to limit this application. In addition, the embodiments of this application and features in the embodiments may be mutually combined in a case of no conflict.

For ease of understanding of the embodiments of this application, technical terms related in the embodiments of this application are explained as follows:

1. Image segmentation is a technology of segmenting a target image containing a target object, to separate a target object region from a background region. The target object may be a person, an animal, or the like. When the target object is a person, the target image may be understood as a portrait image, and a foreground in the portrait image is the person. Target foreground data, that is, target portrait data, of the target object may then be obtained from the portrait image, containing a background, of the target object by using the foreground data generation method provided in this application.

2. A grayscale image, also referred to as a gray scale image or a grey scale image, classifies the color between white and black into several levels according to a logarithmic relationship. The levels are referred to as grayscale, and grayscale is divided into 256 levels. An image represented by using grayscale is referred to as a grayscale image. A grayscale value of a white part in the grayscale image is 255, and a grayscale value of a black part in the grayscale image is 0.

Figure 1A:
FIG. 1a is a schematic effect diagram of a grayscale image j according to an embodiment of this application.
Figure 1B:
FIG. 1b is a schematic effect diagram of an expanded image of a grayscale image j according to an embodiment of this application.
Figure 1C:
FIG. 1c is a schematic effect diagram of an eroded image of a grayscale image j according to an embodiment of this application.

3. A white part (that is, a highlighted part) rather than a black part in a grayscale image is expanded and eroded. Description is made by using a grayscale image shown in FIG. 1a as an example. Expansion is performing an expansion operation on a highlighted part in the image. For an expanded image, reference may be made to FIG. 1b. It can be learned that the expanded image (FIG. 1b) has a highlighted part larger than that of the image before expansion (FIG. 1a). Erosion is performing an erosion operation on the highlighted part in the image. For an eroded image, reference may be made to FIG. 1c. It can be learned that the eroded image (FIG. 1c) has a highlighted part smaller than that of the image before the erosion (FIG. 1a).

4. A mask is mainly a mask of an image segmentation result, and is actually a grayscale image of 0 to 255. A part with a grayscale value of 0 represents a background, and a part with a grayscale value closer to 255 is more likely to be determined as a portrait part.

5. A terminal device is an electronic device on which various applications may be installed and that can display objects provided in the installed applications. The electronic device may be mobile or may be fixed. For example, the terminal device is a mobile phone, a tablet computer, any wearable device, an in-vehicle device, a personal digital assistant (PDA), a point of sales (POS), a surveillance device in a metro station, or another electronic device that can implement the foregoing functions.

6. An application (APP) is a computer program that can complete one or more pieces of specified work, has a visual display interface, and can interact with a user. For example, a live streaming program, a beauty camera application, and the like may all be referred to as applications.

A mask obtained in the first portrait data generation method described in BACKGROUND OF THE DISCLOSURE has relatively poor quality, and fine annotation needs to be performed in a manner similar to drawing by using an artificial brush before relatively adequate portrait data can be separated, which consumes a relatively long time. In the second portrait data generation method, the key to obtaining accurate portrait data is the accuracy of a model. When the model is more accurate, a mask with better quality of a portrait can be obtained. However, when the model is more accurate, a calculation amount is usually larger, and the intensity of a training process is usually higher, which is time-consuming and has a relatively high requirement on hardware.

It consumes a lot of time, manpower, and material resources to obtain portrait data by using the foregoing two methods, consequently greatly limiting application based on the obtained portrait data. Therefore, how to quickly separate portrait data from an image is one of the problems that are worth considering.

To resolve the problem of a relatively long time required for obtaining portrait data due to a requirement of manual participation, an embodiment of this application provides a solution: a computing apparatus 20 is provided, and the computing apparatus 20 implements the foreground data generation method and the method for applying same provided in any embodiment of this application. The computing apparatus may be shown in the form of a general-purpose computing device. The general-purpose computing device may be a terminal device, a server device, or the like. The computing apparatus 20 according to this embodiment of this application is described below with reference to FIG. 2a. The computing apparatus 20 shown in FIG. 2a is only an example, and does not impose any restriction on functions and scopes of use of the embodiments of this application.

Figure 2A:
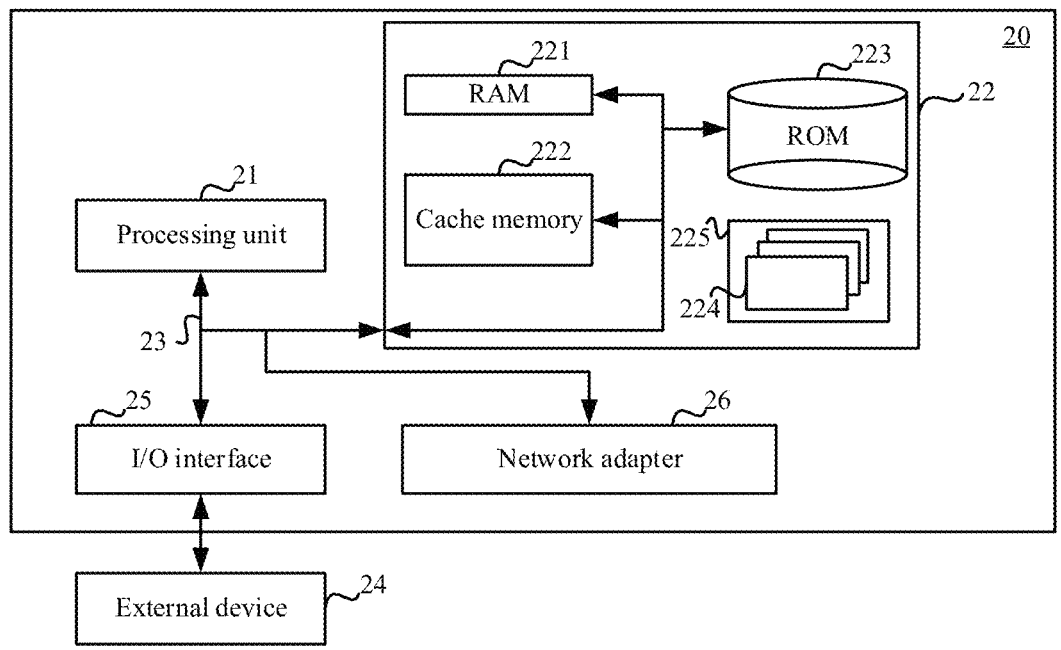
FIG. 2a is a schematic structural diagram of a computing apparatus 20 according to an embodiment of this application.

As shown in FIG. 2a, the computing apparatus 20 is shown in the form of a general computing device. Components of the computing apparatus 20 may include, but are not limited to, at least one processing unit 21, at least one storage unit 22, and a bus 23 connected to different system components (including the storage unit 22 and the processing unit 21).

The bus 23 represents one or more of several types of bus structures, including a memory bus or a memory controller, a peripheral bus, a processor, or a local bus using any bus structure among various bus structures.

The storage unit 22 may include a readable medium in a form a volatile or non-volatile memory, such as a random access memory (RAM) 221 and/or a cache memory 222, and may further include a read-only memory (ROM) 223.

The storage unit 22 may further include a program/utility 225 having a set of (at least one) program modules 224. Such a program module 224 includes, but is not limited to, an operating system, one or more applications, other program modules, and program data. Each or a combination of these examples may include implementation of a network environment.

The computing apparatus 20 may further communicate with one or more external devices 24 (such as a keyboard, a pointing device), and may further communicate with one or more devices that enable a user to interact with the computing apparatus 20, and/or any device (such as a router or a modem) that enables the computing apparatus 20 to communicate with one or more other computing devices. Such communication may be performed by using an input/output (I/O) interface 25. In addition, the computing apparatus 20 may further communicate with one or more networks, such as a local area network (LAN), a wide area network (WAN), and/or a public network, (such as the Internet) by using a network adapter 26. As shown in the figure, the network adapter 26 communicates with other modules configured to the computing apparatus 20 by using the bus 23. It is to be understood that, although not shown in the figure, other hardware and/or software modules may be used in combination with the computing apparatus 20, including, but not limited to, micro code, a device driver, a redundancy processing unit, an external disk drive array, a RAID system, a tape drive, and a data backup storage system.

An application scenario provided in the embodiments of this application is that: after target foreground data of a target object is extracted from a target image based on the method provided in this application, for each background image in a background image set, background data of the background image and the obtained target foreground data of the target object may be used to construct a target image of the target object in the background; and based on this, target images of the target object in various backgrounds may be constructed, and a target image sample set is then constructed, so that training samples can be quickly obtained. Further, a background segmentation model may be trained based on the constructed target image sample set. Based on the foreground data generation method provided in the embodiments of this application, the speed is high, and the extracted target foreground data has high accuracy, so that a highly accurate background segmentation model can be trained. After the background segmentation model is trained, an acquired to-be-processed target image may be segmented, to separate foreground data and background data from the to-be-processed target image. In this way, the separated foreground data and/or background data may be rendered according to an actual requirement of a user, to obtain various image processing results.

When the target object is a person, the target image is a portrait image. Correspondingly, the foregoing initial foreground data is initial portrait data, certain foreground data is certain portrait data, and the target foreground data is target portrait data. An attribute of the target object is not limited in the embodiments of this application, and for ease of description, the subsequent embodiments are described by using examples in which the target object is a person.

With reference to FIG. 2a and the foregoing application scenario, the foreground data generation method, the method for training a background segmentation model, and the image processing method provided in the exemplary embodiments of this application are respectively described with reference to the drawings below. The foregoing application scenario is illustrated merely for ease of understanding of the spirits and principles of the embodiments of this application, and the embodiments of this application are not limited in this aspect. On the contrary, the embodiments of this application can be applied to any applicable scenario.

Figure 2B:
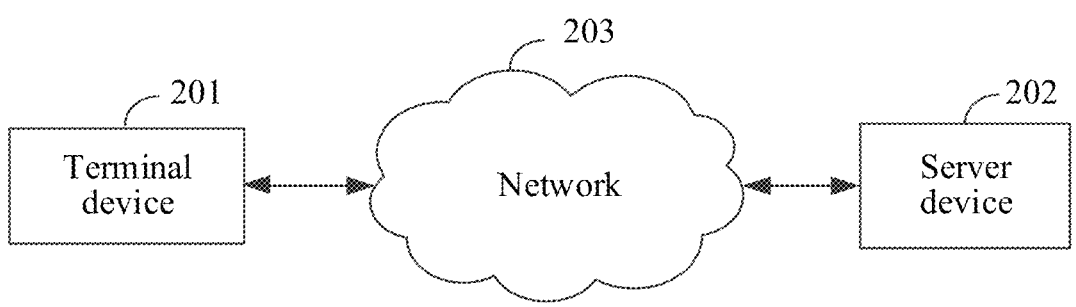
FIG. 2b is a schematic diagram of an implementation environment of a foreground data generation method and a method for applying same according to an embodiment of this application.

FIG. 2b is a schematic diagram of an implementation environment of a foreground data generation method and a method for applying same according to an embodiment of this application. A terminal device 201 is in communication connection with a server device 202 by using a network 203, and the network 203 may be a wired network or a wireless network. The computing apparatus 20 provided in the embodiments of this application may be integrated in the terminal device 201 and the server device 202, to implement the foreground data generation method and the method for applying same provided in any embodiment of this application.

Figure 3:
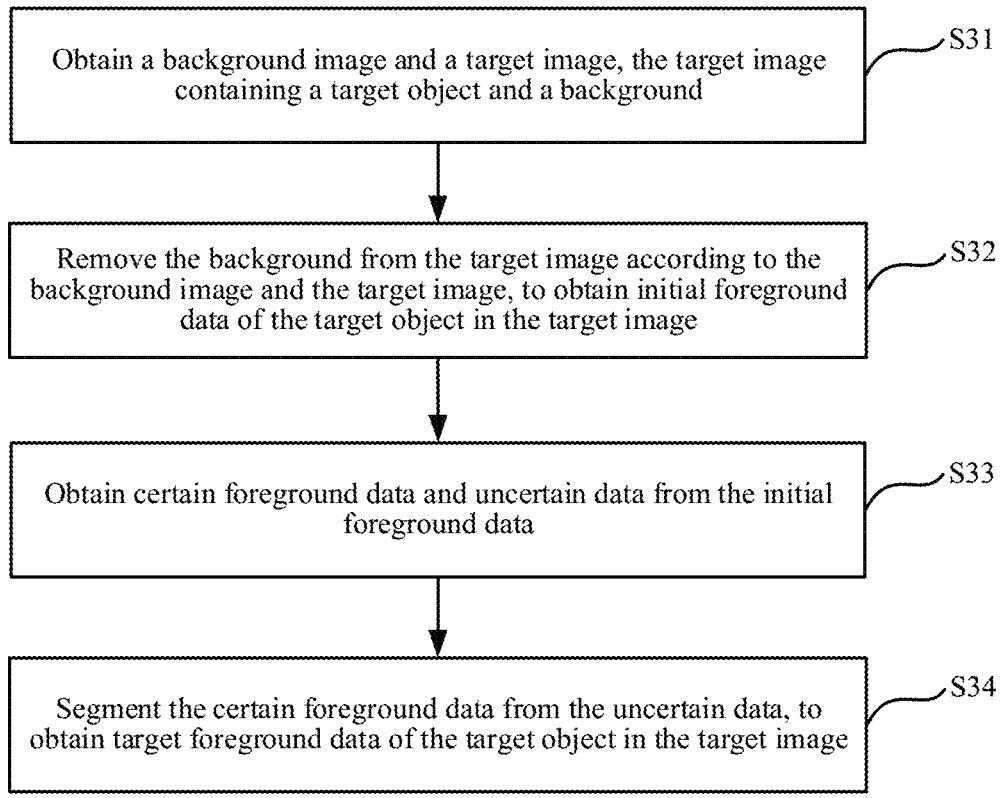
FIG. 3 is a schematic flowchart of a foreground data generation method according to an embodiment of this application.

FIG. 3 is a schematic flowchart of a foreground data generation method according to an embodiment of this application, and the method may include the following steps:

Step S31: Obtain a background image and a target image, the target image containing a target object and a background.

In this step, for each background, an image acquisition device may be fixed. Next, an image (a background image for short) in the background (an image with no target object) is first acquired by using the image acquisition device. The target object then enters an acquisition range of the image acquisition device. In this way, the image acquisition device may acquire a target image, containing the foregoing background, of the target object.

Figure 4A:
FIG. 4a is a schematic effect diagram of a background image according to an embodiment of this application.

In this embodiment of this application, when the target image is a portrait image, to quickly obtain a background image and a portrait image, the image acquisition device may be alternatively used to capture a video, and it is ensured that the video includes a background video frame and a portrait video frame, containing the foregoing background, of the target object. The background video frame, that is, the background image in step S31, is then captured from the video. The portrait video frame, containing the foregoing background, of the target object, that is, the target image in step S31, for example, a portrait image, is captured. Description is made by using an example in which the image acquisition device is a photographing device. The photographing device is fixed and is then turned on to aim at a background to perform photographing for a period of time, and the target object then enters a photographing range of the photographing device, so that the photographing device photographs the target object and the background for a period of time, to obtain a video. In this way, the video includes both background content and portrait content, containing the foregoing background, of the target object. To obtain the background image and the portrait image, capturing may be performed on the recorded video by using an ffmpeg program, to capture an image at a specified time point. For example, the video is decoded into a plurality of images with a high-quality frame rate in a manner of one frame per second, so that the background image can be quickly obtained, referring to FIG. 4a. A portrait image, containing the background in FIG. 4a, of the target object is also quickly obtained, referring to FIG. 4b.

In this embodiment of this application, during obtaining of the target image, at least one target image may be obtained, gestures of the target object in the at least one target image being different from each other.

In this embodiment of this application, in a case that the target images are portrait images, when the portrait images are photographed based on the image acquisition device, different gestures (gestures such as a pout, a V sign, a wink, and a leg raise) made by the target object may be photographed, to obtain a plurality of portrait images with gestures different from each other.

In this embodiment of this application, in a case that the target images are portrait images, when the video is recorded based on the image acquisition device, the target object may make different gestures such as a pout, a V sign, a wink, and a leg raise. In this way, when decoding is performed by using ffmpe, portrait images of the target object in different gestures can be obtained. When small-frame-quantity decoding in a manner of one frame per second is performed by using ffmpe, a quantity of frames for decoding is controlled, so that obtaining of a plurality of portrait images with repetitive gestures can be avoided.

Based on any one of the foregoing embodiments, portrait images of the target object and another target object in another background can be obtained.

Step S32: Remove the background from the target image according to the background image and the target image, to obtain initial foreground data of the target object in the target image.

In this step, initial portrait data may be obtained by using a background subtractor algorithm of MOG2. The MOG2 algorithm is a foreground/background segmentation algorithm based on a Gaussian mixture model. In the algorithm, a mixture of k (k=3 or k=5) Gaussian distributions is used to perform modeling on background pixels, and time lengths of presence of colors in the image are used as weights for mixture. In this way, the target image (portrait image) and the background image in the image are segmented. Generally, colors of a background have relatively long duration and are more static. Based on this principle, the background image and the target image are inputted into the MOG2 algorithm. The MOG2 algorithm can automatically use color regions with high appearance frequency in the inputted image as a background image, and use regions with low appearance frequency as a foreground, so that the background in the portrait image can be removed, to obtain the initial foreground data of the target object in the target image. When the target image is a portrait image, initial portrait data of the target object in the portrait image is obtained.

Figure 4B:
FIG. 4b is a schematic effect diagram of a portrait image, containing a background, of a target object according to an embodiment of this application.
Figure 5:
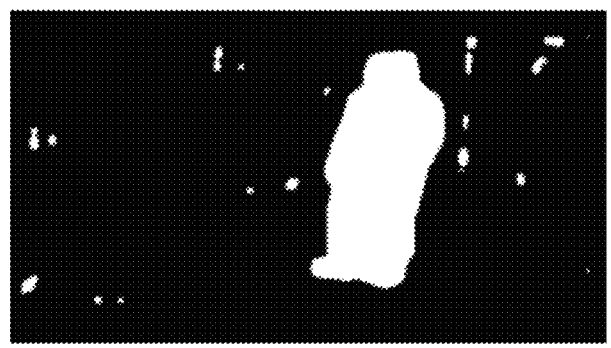
FIG. 5 is a schematic effect diagram of an image formed by initial portrait data according to an embodiment of this application.

Data outputted by using the MOG2 algorithm is the initial portrait data, which is also referred to as a portrait mask. The initial portrait data in this embodiment of this application is data that has only two pixel values, a pixel value of the portrait part is 255, and a pixel value of the background part is 0. Referring to FIG. 5, the background image of FIG. 4*a* and the portrait image of FIG. 4*b* are inputted into the MOG2 algorithm, and an output result of the algorithm is the initial portrait data of a target portrait in the portrait image shown in FIG. 4*b*. FIG. 5 is an image constructed by the initial portrait data. Black in the image corresponds to the background part, and white corresponds to the portrait part. It can be ensured by using the MOG2 algorithm that no portrait in the portrait image is missed in recognition and initial portrait data is definitely obtained, to avoid a problem of a detection miss in a machine annotation method.

In this embodiment of this application, other methods such as a MOG algorithm and a GMG algorithm may be alternatively used to obtain the initial portrait data, and may be specifically determined according to an actual situation.

Step S33: Obtain certain foreground data and uncertain data from the initial foreground data. In some embodiments, the uncertain data represents data whose value is between (e.g., less than) the certain foreground data and (e.g., greater than) background data corresponding to the background in the background image.

Specifically, because the image constructed based on the initial foreground data (initial portrait data) obtained in step S32 has some gaps and redundant parts, the initial foreground data needs to be optimized, to recognize certain foreground data (for example, certain portrait data) and uncertain data in the initial foreground data. The uncertain data is data between the background data and the certain foreground data, and when the uncertain data is represented by using a grayscale value, the grayscale value of the uncertain data is from 0 to 255.

The initial portrait data, the certain portrait data, the uncertain data, the background data, and the subsequent target portrait data in this embodiment of this application may all be represented by using a grayscale value. That is, when any piece of the foregoing data participates operation, the operation is performed for a grayscale value.

Figure 6:
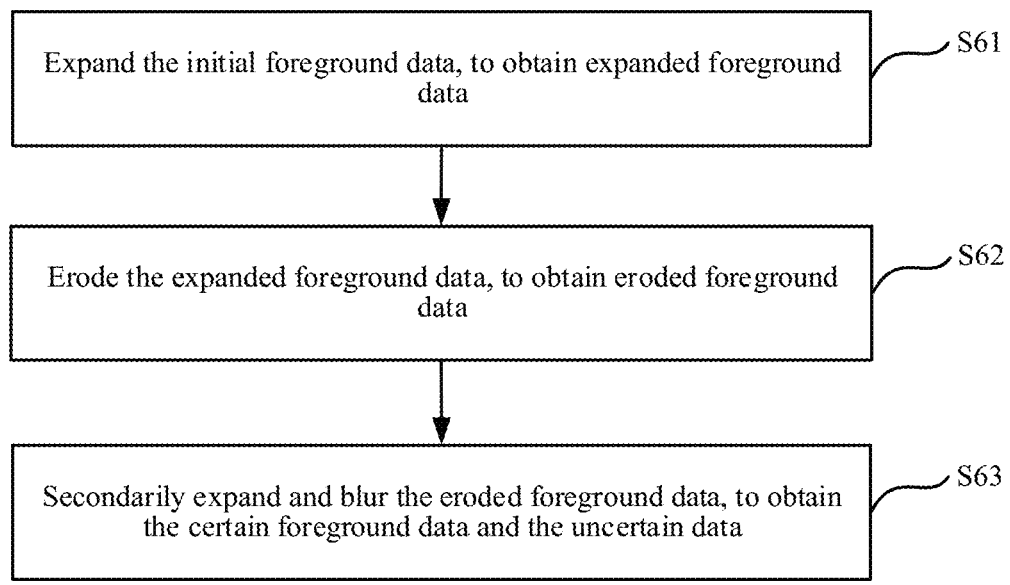
FIG. 6 is a schematic flowchart 1 of optimizing initial foreground data according to an embodiment of this application.

In this embodiment of this application, step S33 may be implemented according to the procedure shown in FIG. 6, and includes the following steps:

Step S61: Expand the initial foreground data, to obtain expanded foreground data.

In this step, the initial foreground data is expanded. Expansion is an expansion operation in morphology. An objective is to remove the gaps in the initial foreground data. Specifically, an expansion degree of the initial foreground data may be first configured, and the initial foreground data is then expanded according to the expansion degree, to obtain expanded foreground data. Redundant noise can be effectively removed by expanding the initial foreground data.

During specific implementation, the expansion degree of the initial foreground data may be configured according to the following formula:

$$NpKernel=np.uint8(np.ones((5, 5)))$$

In the formula, np.ones() is a function for creating an all-1 matrix, and np.ones(5, 5) is used for creating a two-dimensional 5*5 all-1 matrix; and np.uint8() is an 8-bit unsigned integral type function, and represents integers with a range of [0, 255]. Because grayscale values in this embodiment of this application is from 0 to 255, it can be ensured that outputted values are within a range of [0, 255] based on the function np.uint8(); and NpKernel represents the expansion degree.

Based on this, the initial foreground data may be expanded according to the following formula:

$$da=cv.dilate(input, NpKernel)$$

In the formula, cv.dilate() is an expansion function, input is the inputted initial foreground data, and da is the expanded foreground data; and based on the expansion function, the inputted initial foreground data is expanded according to the configured expansion degree, and the expanded data outputted based on this are all from 0 to 255.

Step S62: Erode the expanded foreground data, to obtain eroded foreground data.

In this step, because the initial foreground data is expanded, the expanded foreground data may have a problem of excessive expansion. Therefore, an erosion operation needs to be performed on the expanded foreground data. Erosion is an erosion operation in morphology. Specifically, an erosion degree may be configured first, and an erosion operation is then performed on the expanded foreground data by using an erosion function according to the configured erosion degree.

During specific implementation, the erosion degree kernel may be configured according to the following formula:

$$kernel=np.ones((5,5), np.uint8)$$

In this formula, for description of np.ones() and np.uint8 (), refer to the description in step S61, and details are not described herein again.

$$Erosion=cv2.erode(img, kernel, iterations=n)$$

In this formula, erosion is the eroded foreground data, cv2.erode is the erosion function, img is inputted expanded foreground data, and iterations=n represents n times of repetition, that is, the eroded foreground data is obtained after n times of erosion. In this embodiment of this application, n is generally 1. Considering that light in the image is relatively complex, to avoid incorrect recognition, n may be set to 3, that is, 3 times of repetition. Based on this, after the erosion degree kernel is configured, the expanded foreground data may be eroded by using the erosion function according to the configured kernel, to obtain the eroded foreground data.

Step S63: Secondarily expand and blur the eroded foreground data, to obtain the certain foreground data and the uncertain data.

In this step, to better process edge data, the eroded foreground data (for example, eroded portrait data) is expanded again, and the re-expanded portrait data is then blurred, so that certain portrait data and uncertain data in the initial portrait data can be screened.

Figure 7:
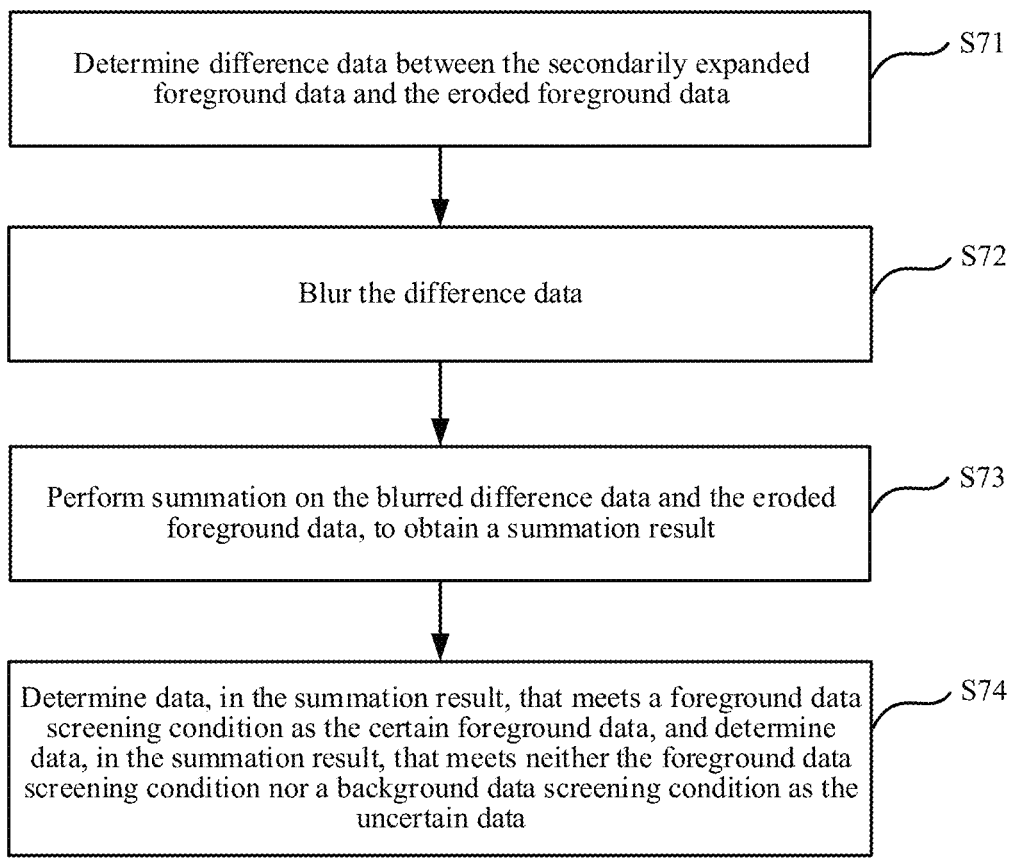
FIG. 7 is a schematic flowchart 2 of optimizing initial foreground data according to an embodiment of this application.

Specifically, step S63 may be implemented according to the procedure shown in FIG. 7, including the following steps:

Step 71: Determine difference data between the re-expanded foreground data and the eroded foreground data.

In this step, the eroded portrait data is recorded as mask, and the difference data in step S71 is represented by using C. An expression of C is:

$$C = \text{dilate}(\text{mask}) - \text{mask}$$

Step S72: Blur the difference data.

In this step, the difference data may be blurred by using a GaussianBlur function, and the blurred difference data is recorded as G. An expression of G is:

$$G = \text{GaussianBlur}(C) = \text{GaussianBlur}(\text{dilate}(\text{mask}) - \text{mask})*0.5$$

The blurring process is performed, so that data between the portrait data and the background data can be obtained through screening from re-expanded portrait data.

Step S73: Perform summation on the blurred difference data and the eroded foreground data, to obtain a summation result.

In this step, the summation result may be recoded as T. An expression of T is:

$$T = G + \text{mask} = \text{GaussianBlur}(\text{dilate}(\text{mask}) - \text{mask})*0.5 + \text{mask}$$

Specifically, during the implementation of erosion, expansion, secondary erosion, and blurring, it is substantially to process matrices formed by data. Description is made by using an example in which the data is grayscale values. During the implementation of step S73, summation may be performed on a matrix formed by blurred difference data (differences between grayscale values) and a matrix formed by the eroded portrait data (grayscale values), so that the obtained summation result T is also a matrix.

Step S74: Determine data, in the summation result, that meets a foreground data screening condition as the certain foreground data, and determine data, in the summation result, that meets neither the foreground data screening condition nor a background data screening condition as the uncertain data.

Figure 8A:
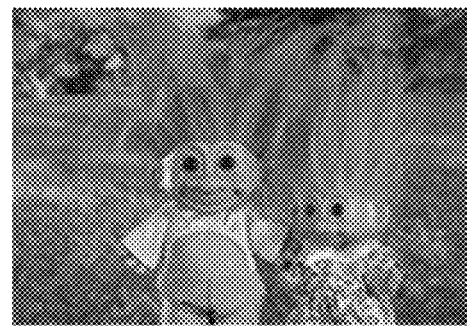
FIG. 8a is a schematic effect diagram of a portrait image containing a background according to an embodiment of this application.
Figure 8B:
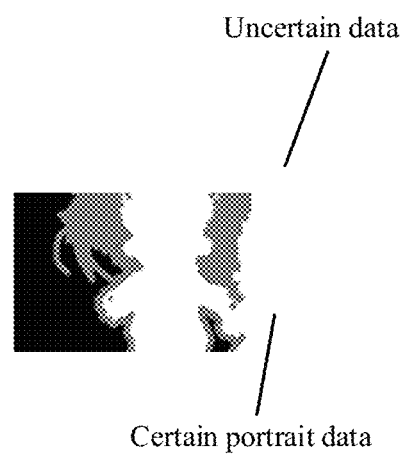
FIG. 8b is a schematic effect diagram of an image formed by certain portrait data and uncertain data according to an embodiment of this application.

In this step, after the summation result is obtained, the summation result T includes three types of data representing three types of regions, that is, the background data, the uncertain data, and the certain foreground data. A grayscale value of the foreground data is 255, and a grayscale value of the background data is 0, so that the foreground data screening condition may be set to that an element value is 255, and the background data screening condition may be set to that an element value is 0. Therefore, based on the summation result T, data with an element value of 255 in the matrix T can be screened, and the data obtained through screening is the certain foreground data; and data with an element value being neither 255 nor 0 may further be obtained from the matrix T through screening, and the data obtained through screening is the uncertain data. When the target image is a portrait image, FIG. 8a shows a portrait image that contains a background. When the optimization process shown in FIG. 7 is implemented after initial portrait data of the portrait image is obtained based on step S32, for the determined certain portrait data and uncertain data, reference may be made to FIG. 8b. In FIG. 8b, a gray part is the uncertain data, a white part is the certain portrait data, and a black part in FIG. 8b is the background data.

Step S34: Segment the certain foreground data from the uncertain data, to obtain target foreground data of the target object in the target image.

Specifically, image matting may be performed on the certain foreground data and the uncertain data by using an image matting algorithm, to determine the target foreground data of the target object in the target image. The image matting algorithm in this embodiment of this application may include, but not limited to, a global matting algorithm, and a deep image matting algorithm.

During image matting, description is made by using the global matting algorithm as an example. Image matting may then be performed according to the following formula:

$$M = \text{global matting}\{T[t<=255]\}$$

In this formula, M is the target foreground data of the target object in the target image, T is the summation result, and t is each element in T. Based on the formula, the uncertain data may be defined, to define which uncertain data is target foreground data and define which uncertain data is background data.

Figure 8C:
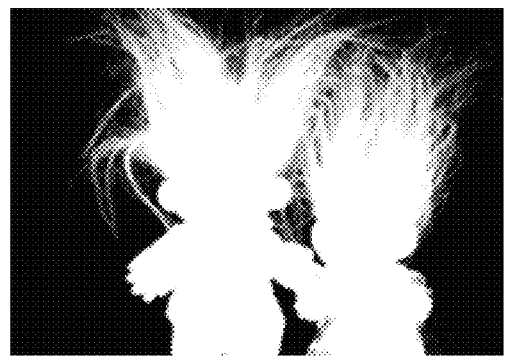
FIG. 8c is a schematic diagram of an image formed by portrait data obtained after image matting is performed on FIG. 8b according to an embodiment of this application.

FIG. 8c shows an image formed by portrait data obtained after image matting is performed on FIG. 8b. Because an average of the portrait data is obtained through processing on a grayscale image, and a portrait image, containing a background, of the target object is a color image, portrait data obtained after the image matting needs to be converted into color portrait data, and the obtained color portrait data is target portrait data of the target object in the portrait image. Specifically, during conversion into the color portrait data, search may be performed by using a pixel as a unit, and a pixel at each position of the portrait data after the image matting is selected. The portrait image of the target object is then searched for a pixel at a corresponding position. In this way, color data of the pixel can be obtained, and target portrait data of the target object in the portrait image is then obtained based on color data of pixels. Based on this, the target portrait data can be obtained without manual annotation and model training. In addition, manual annotation is not required, thereby effectively avoid a problem that separated portrait data is inaccurate due to a problem of inaccuracy in manual annotation.

In this embodiment of this application, in a case that target images are portrait images, when a plurality of portrait images with gestures different from each other are obtained in step S31, target portrait data in the portrait images may be extracted based on the procedure provided in this embodiment of this application, to construct a target portrait dataset.

Figure 9A:
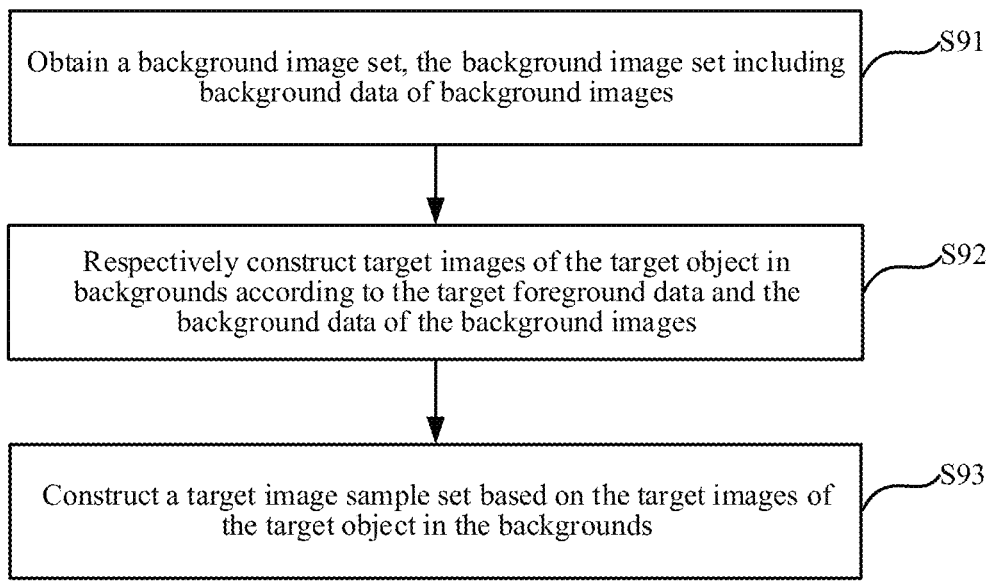
FIG. 9a is a schematic flowchart of a method for constructing a target image dataset according to an embodiment of this application.

Based on this, various backgrounds may be replaced with the obtained target foreground data, to obtain target images of the target object in the backgrounds. Specifically, a target image dataset may be constructed by implementing the procedure shown in FIG. 9a, which includes the following steps:

Step S91: Obtain a background image set, each background image having a unique background.

Figure 9B:
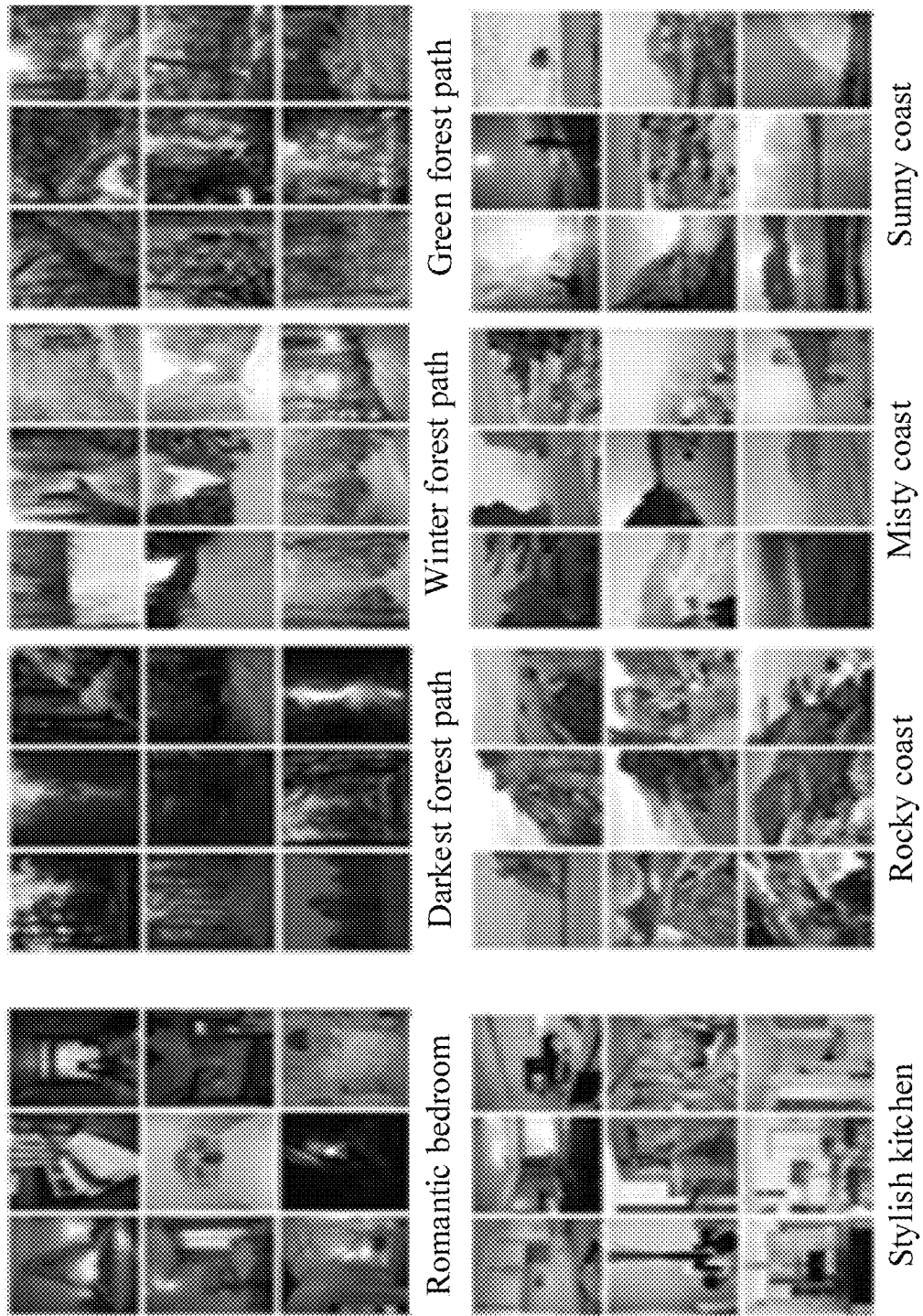
FIG. 9b is a schematic effect diagram of some background images in a places dataset according to an embodiment of this application.

In this step, the background image set may be a places dataset. The places dataset is a database centered on scenarios, and includes 205 scenario categories and 2.5 million images with category labels. FIG. 9b merely lists some background images in the places dataset.

Step S92: Respectively construct target images of the target object in the unique backgrounds of the background images according to the target foreground data.

Figure 9C:
FIG. 9c is a schematic diagram of a portrait image of a target object according to an embodiment of this application.
Figure 9D:
FIG. 9d is a schematic effect diagram of a portrait image formed by certain portrait data and uncertain data determined based on FIG. 9c according to an embodiment of this application.
Figure 9E:
FIG. 9e is a schematic effect diagram of an image formed by target portrait data determined based on FIG. 9d according to an embodiment of this application.
Figure 9F:
FIG. 9f is a schematic effect diagram of an image after a background is replaced based on target portrait data in FIG. 9d according to an embodiment of this application.

In this step, for each background image, when a target image of the target object in the background is constructed, the target foreground data and the background image may be first set to the same size, and for each pixel in the target foreground data, a pixel value of a pixel at a corresponding position in the background image is then set to a pixel value of the pixel in the target foreground data. By analogy, a target image of the target object in the background can be constructed. In this way, a problem of high costs and high time consumption because target images need to be photographed in all backgrounds can be avoided. Description is made by using a portrait image of a target object shown in FIG. 9c as an example. After initial portrait data of FIG. 9c is optimized to obtain certain portrait data and uncertain data, for a portrait image formed based on the two pieces of data, reference may be made to FIG. 9d. Subsequently, after image matting is performed by using the deep image matting algorithm, target portrait data of the target object may be obtained. For an image formed by the target portrait data, reference may be made to FIG. 9e. Further, for a background image, a portrait image of the target object in the background may be constructed based on the target portrait data and background data of the background image, referring to FIG. 9f.

Step S93: Construct a target image sample set based on the target images of the target object in the unique backgrounds.

Specifically, when portrait images of the target object in different backgrounds are obtained, a portrait image sample set may be constructed by using the portrait images, thereby reducing time and costs for generating the sample set, and achieving an objective of quickly separating the portrait data.

Figure 10:
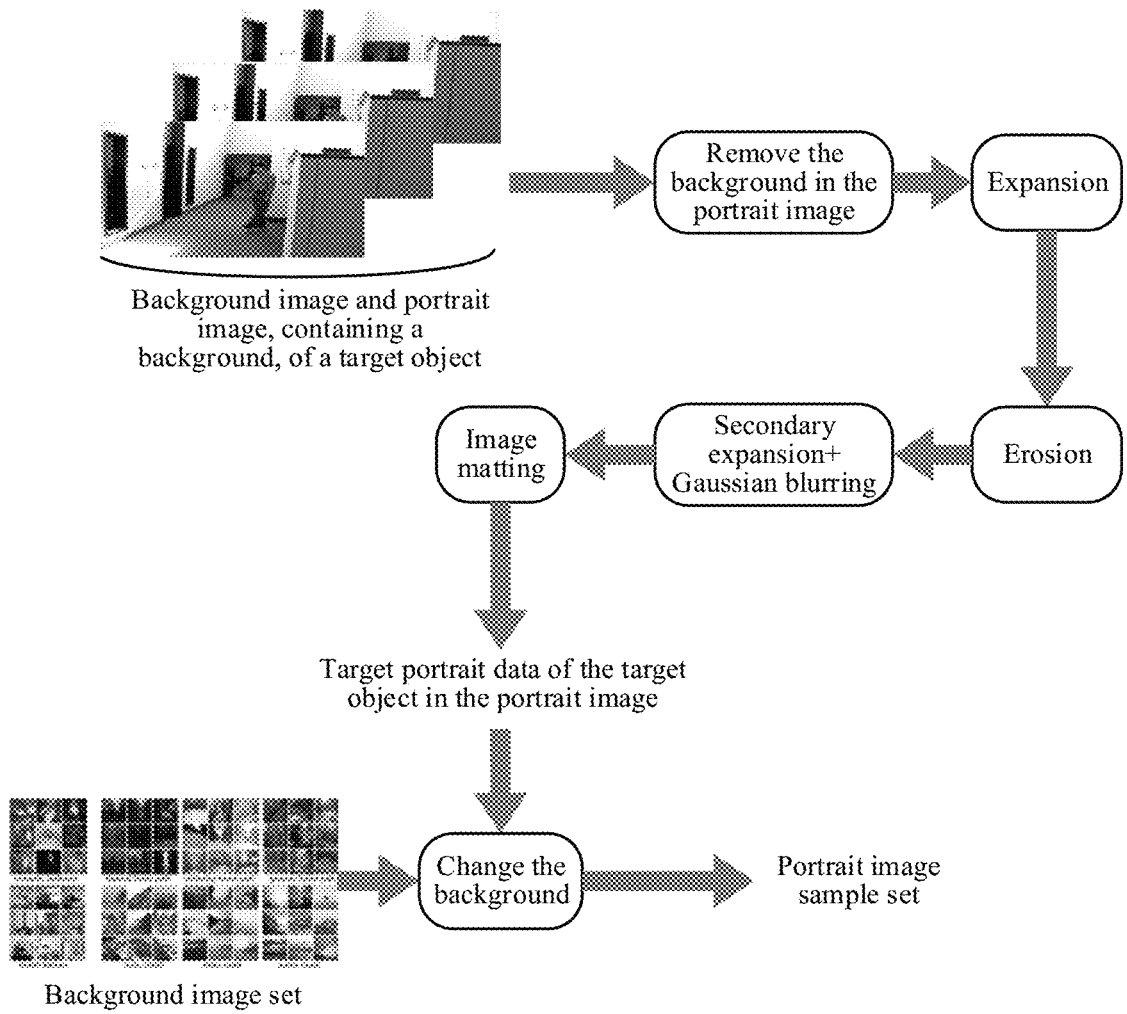
FIG. 10 is an architecture diagram of execution logic of a portrait data generation method according to an embodiment of this application.

To better understand this application, referring to FIG. 10, a background data generation method provided in an embodiment of this application is described. When a target image is a portrait image, a background image and a portrait image, containing a background, of a target object are first obtained. The background image and the portrait image are then inputted into a MOG2 algorithm, so that the background in the portrait image can be removed, to obtain initial portrait data of the target object. The initial portrait data is then expanded, and subsequently an erosion operation is performed on the expanded portrait data, to obtain eroded portrait data. The eroded portrait data is then re-expanded, difference data between the re-expanded portrait data and the eroded portrait data is determined, and Gaussian blurring is performed on the difference data. Summation is then performed on the blurred difference data and the eroded portrait data. Data with a grayscale value of 255 is obtained through screening from the summation result. The data obtained through screening is determined as certain portrait data, data with a grayscale value being neither 255 nor 0 is obtained through screening from the summation result, and the data meeting the condition is determined as uncertain data. Image matting is then performed on the certain portrait data and the uncertain data, to obtain target portrait data of the target object in FIG. 10 in the background. Based on this, a background image set is obtained, and portrait images of the target object in the backgrounds may then be respectively constructed according to the target portrait data and background data of backgrounds, to obtain a portrait image sample set. In this way, target portrait data of the target object is quickly separated from the portrait image, and the portrait image sample set is quickly created, thereby expanding the application scenarios of the target portrait data. In addition, the obtained target portrait data of the target object is more accurate by expanding, eroding, re-expanding, and blurring the initial portrait data.

Based on any one of the foregoing embodiments, the obtained target image sample set may be used for training a background segmentation model. Specifically, the background segmentation model may be trained according to the method shown in FIG. 11, including the following steps:

Step S111: Obtain a constructed target image sample set.

Step S112: Train a background segmentation model by using the target image sample set.

Figure 11:
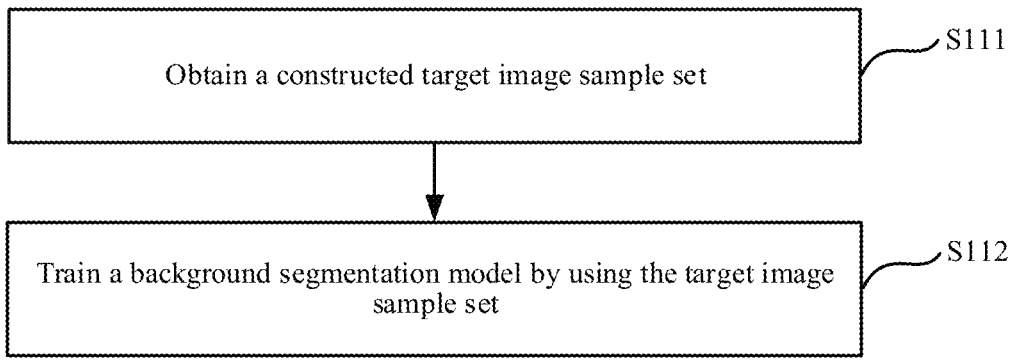
FIG. 11 is a schematic flowchart of a method for training a background segmentation model according to an embodiment of this application.

In the procedure shown in FIG. 11, in a case that the target image sample set is a portrait image sample set, during training of the background segmentation model, a portrait image sample set pre-constructed based on the portrait data generation method provided in the embodiments of this application may be first obtained. Subsequently, each piece of target portrait data in the portrait image sample set is annotated, and an annotated portrait image in each background is inputted into a background segmentation model. In a training process of the model, a loss function may be introduced. For example, a Euclidean distance is used for determining a deviation between an output and an input of the background segmentation model, that is: determining a sum of squares of differences between target portrait data outputted by the model and the annotated target portrait data; and weights of neurons in the background segmentation model are adjusted according to the result. When a quantity of iterations reaches an end condition or the adjusted background segmentation model meets a convergence condition, the training ends, so that a trained background segmentation model can be obtained.

By means of the method for training a background segmentation model provided in this embodiment of this application, the target portrait data in the portrait image sample set has relatively high accuracy, thereby greatly improving accuracy of a separation result of the trained background segmentation model.

After the background segmentation model is obtained, image processing may be performed by using the trained background segmentation model. An image processing procedure may be specifically implemented according to the method shown in FIG. 12a, which includes the following steps:

Step S121: Acquire a to-be-processed target image.

Step S122: Separate foreground data and background data from the to-be-processed target image by using a trained background segmentation model.

Step S123: Separately render the foreground data and the background data of the to-be-processed target image.

Figure 12A:
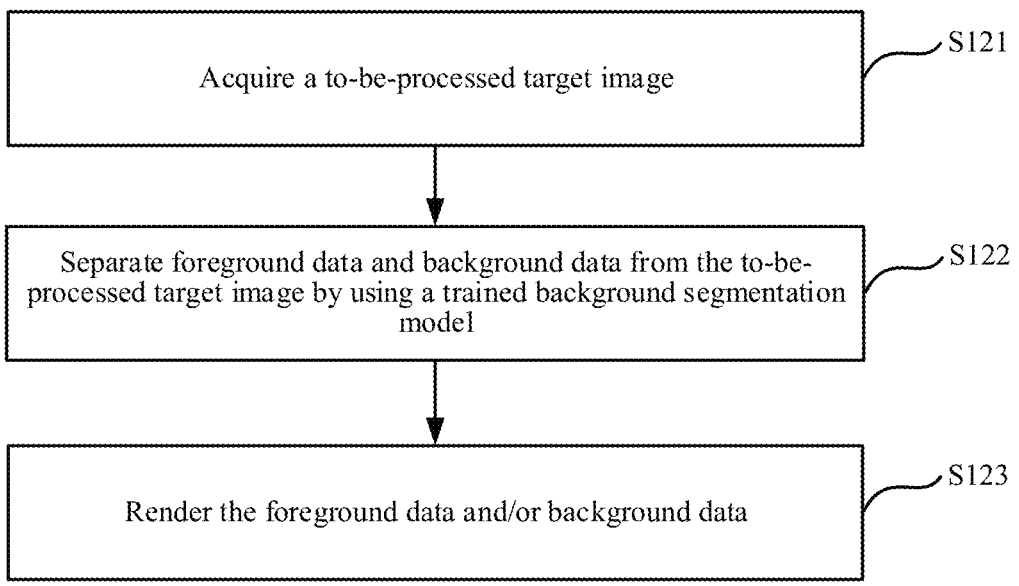
FIG. 12a is a schematic flowchart of an image processing method according to an embodiment of this application.

By means of the method shown in FIG. 12a, when the to-be-processed target image are to-be-processed portrait images, for each of the to-be-processed portrait images, background data and portrait data may be separated from the to-be-processed portrait image by using the background segmentation model trained based on the portrait image sample set in this embodiment of this application, and the portrait data and/or background data may then be rendered according to a service scenario or an actual requirement of a user, so that a rendered result can meet expectation of the user.

Figure 12B:
FIG. 12b is a schematic effect diagram of a to-be-processed portrait image acquired by a photographing device according to an embodiment of this application.
Figure 12C:
FIG. 12c to FIG. 12f are respectively schematic effect diagrams of rendering the to-be-processed portrait image in FIG. 12b according to an embodiment of this application.
Figure 12D:
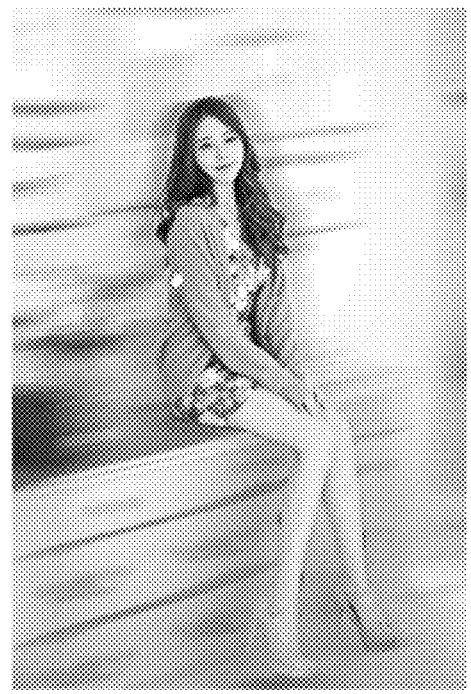
Figure 12E:
Figure 12F:

In this embodiment of this application, the image processing method provided in this embodiment of this application is applied to a scenario of photographing by a user, and an increasing quantity of users like to process photos of the users to be beautiful, to improve the confidence of the users and lift the mood of the users. Based on this requirement, the image processing method provided in this embodiment of this application may be embedded in a photographing device. Description is made with reference to FIG. 12b. FIG. 12b shows an original image of a target object photographed by the photographing device, that is, a to-be-processed portrait image in this embodiment of this application. Portrait data and background data are then separated from the image of FIG. 12b by using the background segmentation model provided in this embodiment of this application. After the portrait data and the background data are separated, blurring (referring to FIG. 12c and FIG. 12d), pixelization (referring to FIG. 12e), or black-and-white line drawing processing (referring to FIG. 12f) may be performed on a background according to a requirement of the user, so that a rendered image can meet an actual requirement of the user.

In this embodiment of this application, for example, in a live streaming process of a streamer, the streamer may perform live streaming at home, but expects to switch to a background related to live streaming content. Based on this requirement, when a user expects to switch a background in the live streaming process, an image acquisition instruction is triggered. After the instruction is received, a to-be-processed portrait image may be acquired. Portrait data and background data are then separated from the to-be-processed portrait image by using the background segmentation model trained in this embodiment of this application. Background data of a background to which the user needs to switch is then obtained. A portrait image in the background is then constructed by using the separated portrait data and the background data of the background to be switched to. The portrait image is then displayed in the live streaming process. In this way, switching of a background is quickly implemented, and a requirement of the user is met, thereby improving user satisfaction.

In this embodiment of this application, with the emergence and popularization of bullet comments, when viewing videos, users usually express opinions and the like of the users by using bullet comments. However, as a quantity of users posting bullet comments increases and bullet comments are directly embedded into video content in the prior art, the posted bullet comments block the currently played video content. To avoid this problem, in a video playing process, when it is detected that a user posts a bullet comment, according to a time point at which the user posts the bullet comment, a video frame matching the time point may be found, and background data and portrait data are then separated from the video frame by using the background segmentation model trained in this embodiment of this application. In this way, the bullet comment posted by the user may be embedded into the background data, so that the posted bullet comment is only displayed on a background part, thereby effectively avoiding a case in which the viewing of a video by users is affected when an excessively large quantity of bullet comments block a character in a video frame because the bullet comments are posted on foreground content.

The background segmentation model in this embodiment of this application may be alternatively applied to other scenarios, and application scenarios of the background segmentation model are not limited in this embodiment of this application.

Based on the same inventive concept, an embodiment of this application further provides a foreground data generation apparatus. Because a principle for the foregoing apparatus to resolve a problem is similar to that of the foreground data (for example, portrait data) generation method, for implementation of the apparatus, reference may be made to the implementation of the foregoing method. Repeated content is not described herein again.

Figure 13:
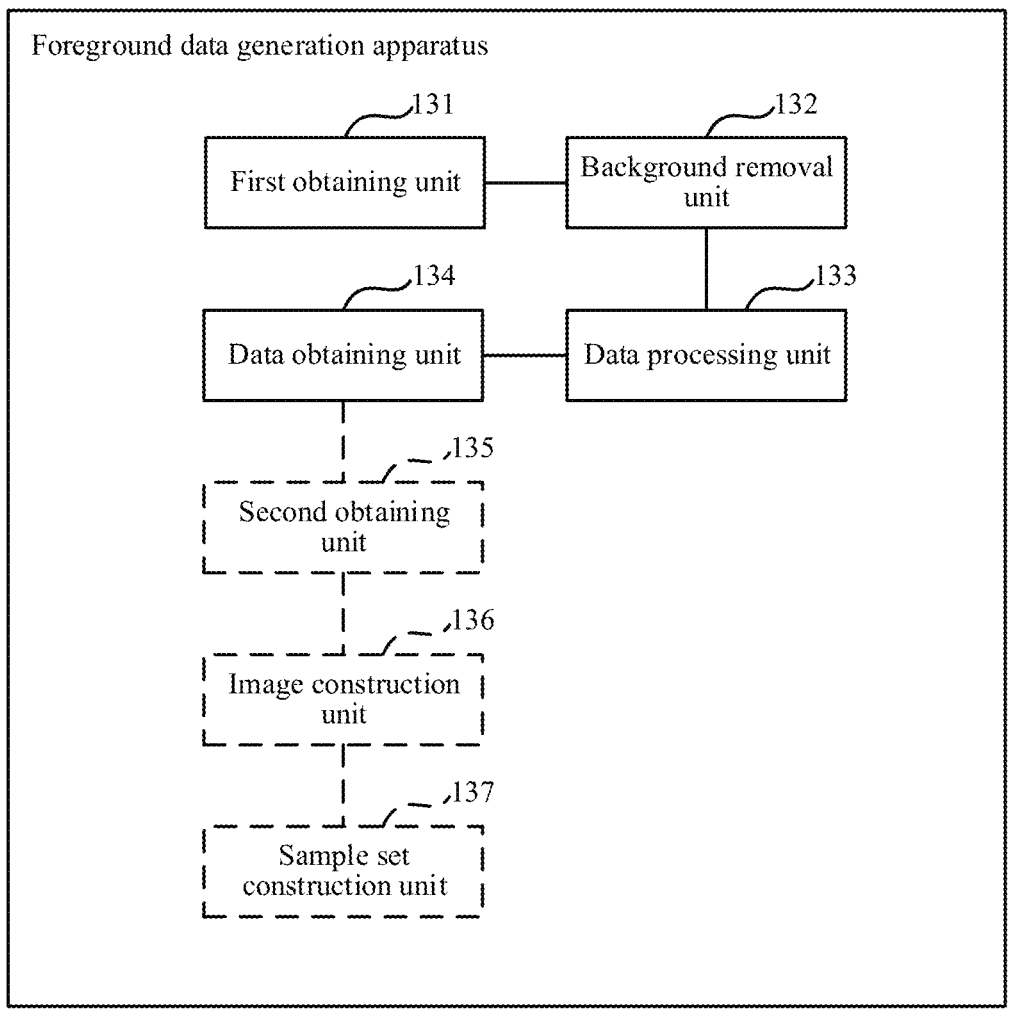
FIG. 13 is a schematic structural diagram of a foreground data generation apparatus according to an embodiment of this application.

FIG. 13 is a schematic structural diagram of a foreground data generation apparatus according to an embodiment of this application, including:
a first obtaining unit 131, configured to obtain a background image and a target image, the target image containing a target object and a background;
a background removal unit 132, configured to remove the background from the target image according to the background image and the target image, to obtain initial foreground data of the target object in the target image;
a data processing unit 133, configured to obtain certain foreground data and uncertain data from the initial foreground data, wherein the uncertain data represents data whose value is between the certain foreground data and background data corresponding to the background; and
a data obtaining unit 134, configured to segment the certain foreground data from the uncertain data, to obtain target foreground data of the target object in the target image.

In this embodiment of this application, the data processing unit 133 is specifically configured to: expand the initial foreground data, to obtain expanded foreground data; erode the expanded foreground data, to obtain eroded foreground data; and re-expand and blur the eroded foreground data, to obtain the certain foreground data and the uncertain data.

In this embodiment of this application, the data processing unit 133 is specifically configured to: determine difference data between the re-expanded foreground data and the eroded foreground data; blur the difference data; perform summation on the blurred difference data and the eroded foreground data, to obtain a summation result; and determine data, in the summation result, that meets a foreground data screening condition as the certain foreground data, and determine data, in the summation result, that meets neither the foreground data screening condition nor a background data screening condition as the uncertain data.

In this embodiment of this application, the first obtaining unit 131 is specifically configured to obtain at least one target image, gestures of the target object in the at least one target image being different from each other.

In this embodiment of this application, the foreground data generation apparatus further includes:
a second obtaining unit 135, configured to obtain a background image set, each background image having a unique background;
an image construction unit 136, configured to respectively construct target images of the target object in the unique backgrounds of the background images according to the target foreground data; and
a sample set construction unit 137, configured to construct a target image sample set based on the target images of the target object in the unique backgrounds.

For ease of description, the foregoing components are respectively described as various modules (or units) divided according to functions. Certainly, during the implementation of this application, the function of the various modules (or units) may be implemented in a same piece of or multiple pieces of software or hardware.

Based on the same inventive concept, an embodiment of this application further provides an apparatus for training a background segmentation model. Because a principle for the foregoing apparatus to resolve a problem is similar to that of the method for training a background segmentation model, for implementation of the apparatus, reference may be made to the implementation of the foregoing method. Repeated content is not described herein again.

Figure 14:
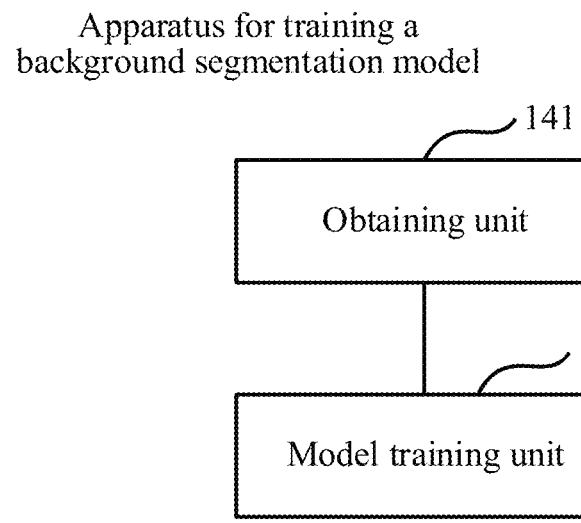
FIG. 14 is a schematic structural diagram of an apparatus for training a background segmentation model according to an embodiment of this application.

FIG. 14 is a schematic structural diagram of an apparatus for training a background segmentation model according to an embodiment of this application, including
- an obtaining unit 141, configured to obtain a target image sample set constructed based on the foreground data generation method provided in the embodiments of this application; and
- a model training unit 142, configured to train a background segmentation model by using the target image sample set.

For ease of description, the foregoing components are respectively described as various modules (or units) divided according to functions. Certainly, during the implementation of this application, the function of the various modules (or units) may be implemented in a same piece of or multiple pieces of software or hardware.

Based on the same inventive concept, an embodiment of this application further provides an image processing apparatus. Because a principle for the foregoing apparatus to resolve a problem is similar to that of the image processing method, for implementation of the apparatus, reference may be made to the implementation of the foregoing method. Repeated content is not described herein again.

Figure 15:
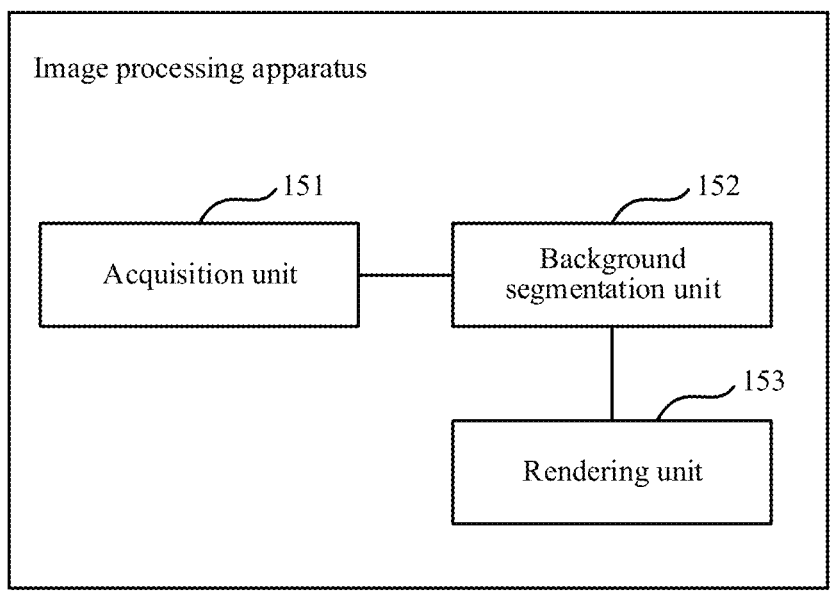
FIG. 15 is a schematic structural diagram of an image processing apparatus according to an embodiment of this application.

FIG. 15 is a schematic structural diagram of an image processing apparatus according to an embodiment of this application, including:
- an acquisition unit 151, configured to acquire a to-be-processed target image;
- a background segmentation unit 152, configured to separate foreground data and background data from the to-be-processed target image by using a background segmentation model trained by using the method for training a background segmentation model provided in the embodiments of this application; and
- a rendering unit 153, configured to separately render the foreground data and the background data of the to-be-processed target image.

For ease of description, the foregoing components are respectively described as various modules (or units) divided according to functions. Certainly, during the implementation of this application, the function of the various modules (or units) may be implemented in a same piece of or multiple pieces of software or hardware. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 16:
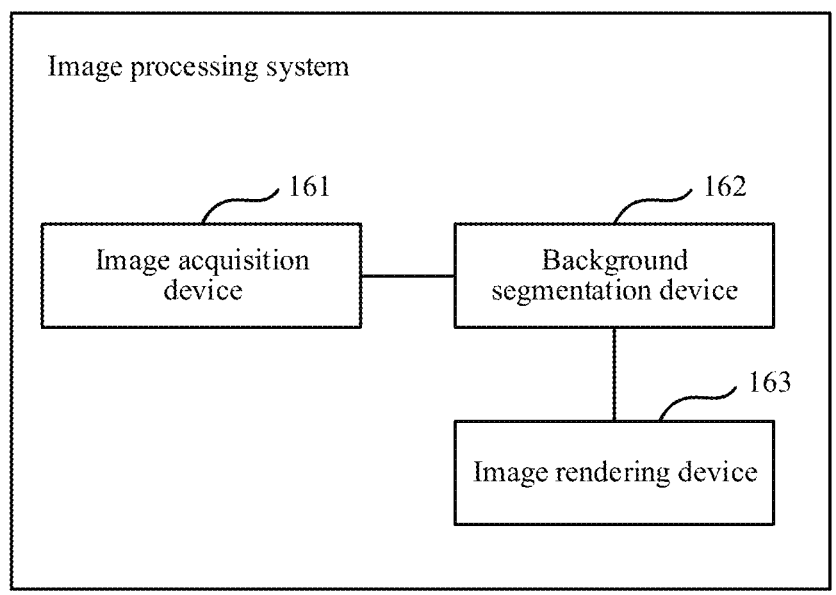
FIG. 16 is a schematic structural diagram of an image processing system according to an embodiment of this application.

Based on any one of the foregoing embodiments, an embodiment of this application further provides an image processing system. Referring to FIG. 16, the image processing system includes at least: an image acquisition device 161, a background segmentation device 162, and an image rendering device 163. In this embodiment of this application, the image acquisition device 161, the background segmentation device 162, and the image rendering device 163 may be integrated into the same device, or may be distributed into a plurality of devices that are connected to and communicate with each other, and form an image processing system for use. For example, for a beautification function, the image acquisition device 161 may be a camera, and the background segmentation device and the image rendering device may be computer devices communicating with the camera.

Specifically, the image acquisition device 161 is configured to acquire a to-be-processed target image.

The background segmentation device 162 is configured to separate foreground data and background data from the to-be-processed target image by using a background segmentation model trained by using the method for training a background segmentation model provided in the embodiments of this application.

The image rendering device 163 is configured to separately render the foreground data and the background data of the to-be-processed target image.

Based on any one of the foregoing embodiments, an embodiment of this application further provides an electronic device in another exemplary implementation. In some possible implementations, the electronic device in this embodiment of this application may include a memory, a processor, and a computer program stored in the memory and runnable on the processor, the program, when executed by the processor, implementing steps in the foreground data generation method, the method for training a background segmentation model, or the image processing method provided in the foregoing embodiments.

Description is made by using an example in which the electronic device is the computing apparatus in FIG. 2a of this application. In this case, the processor in the electronic device is the processing unit 21 in the computing apparatus in FIG. 2a, and the memory in the electronic device is the storage unit 22 in the computing apparatus in FIG. 2a.

Based on any one of the foregoing embodiments, in an embodiment of this application, a computer-readable storage medium is provided, storing a computer program, the computer program, when executed by a processor, implementing the foreground data generation method or method for training a background segmentation model or image processing method according to any method embodiments described above.

Although several units or subunits of the apparatus are mentioned in detailed description above, such division is merely an example but not mandatory. Actually, according to the embodiments of this application, features and functions of two or more units described above may be specified in one unit. On the contrary, the features or functions of one unit described above may further be divided and specified by a plurality of units.

In addition, although the operations of the method in the embodiments of this application are described in a specific order in the accompanying drawings. This does not require or imply that the operations have to be performed in the specific order, or all the operations shown have to be performed to achieve an expected result. Additionally or alternatively, some operations may be omitted, and a plurality of operations are combined into one operation to be performed, and/or one operation is divided into a plurality of operations to be performed.

A person skilled in the art is to understand that the embodiments of this application may be provided as a method, a system, or a computer program product. Therefore, this application may use a form of hardware-only embodiments, software-only embodiments, or embodiments combining software and hardware. Moreover, the embodiments of this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the other programmable device, thereby generating computer-implemented processing. Therefore, the instructions executed on the computer or the another programmable device provide steps for implementing a specific function in one or more processes in the flowcharts and/or in one or more blocks in the block diagrams.

Although the exemplary embodiments of this application have been described, once a person skilled in the art learns a basic creative concept, other changes and modifications may be made to these embodiments. Therefore, the following claims are intended to cover the exemplary embodiments and all changes and modifications falling within the scope of this application.

Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A foreground data generation method performed by a computer device, the method comprising:
    obtaining a background image and a target image, the target image containing a target object and a background;
    removing the background from the target image according to the background image and the target image, to obtain initial foreground data of the target object in the target image;
    obtaining certain foreground data and uncertain data from the initial foreground data, wherein the uncertain data represents data whose value is between the certain foreground data and background data corresponding to the background; and
    segmenting the certain foreground data from the uncertain data, to obtain target foreground data of the target object in the target image.

2. The method according to claim 1, wherein the obtaining certain foreground data and uncertain data from the initial foreground data comprises:
    expanding the initial foreground data, to obtain expanded foreground data;
    eroding the expanded foreground data, to obtain eroded foreground data; and
    re-expanding and blurring the eroded foreground data, to obtain the certain foreground data and the uncertain data.

3. The method according to claim 2, wherein the re-expanding and blurring the eroded foreground data, to obtain the certain foreground data and the uncertain data comprises:
    determining difference data between the re-expanded foreground data and the eroded foreground data;
    blurring the difference data;
    performing summation on the blurred difference data and the eroded foreground data, to obtain a summation result; and
    determining data, in the summation result, that meets a foreground data screening condition as the certain foreground data, and determining data, in the summation result, that meets neither the foreground data screening condition nor a background data screening condition as the uncertain data.

4. The method according to claim 1, wherein the obtaining a target image, containing a target object and a background comprises:
    obtaining multiple target images, each target image containing the target object having a gesture and gestures of the target object in the multiple target images being different from each other.

5. The method according to claim 1, further comprising:
    obtaining a background image set, each background image having a unique background;
    respectively constructing target images of the target object in the unique backgrounds of the background images according to the target foreground data; and
    constructing a target image sample set based on the target images of the target object in the unique backgrounds.

6. The method according to claim 5, further comprising:
    training a background segmentation model by using the target image sample set.

7. The method according to claim 6, further comprising:
    acquiring a to-be-processed target image;
    separating foreground data and background data from the to-be-processed target image by using the background segmentation model; and separately rendering the foreground data and the background data of the to-be-processed target image.

8. A computer device, comprising a memory, a processor, and a plurality of computer programs stored in the memory that, when executed by the processor, cause the computer device to perform a plurality of operations including:
obtaining a background image and a target image, the target image containing a target object and a background;
removing the background from the target image according to the background image and the target image, to obtain initial foreground data of the target object in the target image;
obtaining certain foreground data and uncertain data from the initial foreground data, wherein the uncertain data represents data whose value is between the certain foreground data and background data corresponding to the background; and
segmenting the certain foreground data from the uncertain data, to obtain target foreground data of the target object in the target image.

9. The computer device according to claim 8, wherein the obtaining certain foreground data and uncertain data from the initial foreground data comprises:
expanding the initial foreground data, to obtain expanded foreground data;
eroding the expanded foreground data, to obtain eroded foreground data; and
re-expanding and blurring the eroded foreground data, to obtain the certain foreground data and the uncertain data.

10. The computer device according to claim 9, wherein the re-expanding and blurring the eroded foreground data, to obtain the certain foreground data and the uncertain data comprises:
determining difference data between the re-expanded foreground data and the eroded foreground data;
blurring the difference data;
performing summation on the blurred difference data and the eroded foreground data, to obtain a summation result; and
determining data, in the summation result, that meets a foreground data screening condition as the certain foreground data, and determining data, in the summation result, that meets neither the foreground data screening condition nor a background data screening condition as the uncertain data.

11. The computer device according to claim 8, wherein the obtaining a target image, containing a target object and a background comprises:
obtaining multiple target images, each target image containing the target object having a gesture and gestures of the target object in the multiple target images being different from each other.

12. The computer device according to claim 8, wherein the plurality of operations further comprise:
obtaining a background image set, each background image having a unique background;
respectively constructing target images of the target object in the unique backgrounds of the background images according to the target foreground data; and
constructing a target image sample set based on the target images of the target object in the unique backgrounds.

13. The computer device according to claim 12, wherein the plurality of operations further comprise:
training a background segmentation model by using the target image sample set.

14. The computer device according to claim 13, wherein the plurality of operations further comprise:
acquiring a to-be-processed target image;
separating foreground data and background data from the to-be-processed target image by using the background segmentation model; and
separately rendering the foreground data and the background data of the to-be-processed target image.

15. A non-transitory computer-readable storage medium, storing processor-executable instructions, the processor-executable instructions, when executed by a processor of a computer device, causing the computer device to perform a plurality of operations including:
obtaining a background image and a target image, the target image containing a target object and a background;
removing the background from the target image according to the background image and the target image, to obtain initial foreground data of the target object in the target image;
obtaining certain foreground data and uncertain data from the initial foreground data, wherein the uncertain data represents data whose value is between the certain foreground data and background data corresponding to the background; and
segmenting the certain foreground data from the uncertain data, to obtain target foreground data of the target object in the target image.

16. The non-transitory computer-readable storage medium according to claim 15, wherein the obtaining certain foreground data and uncertain data from the initial foreground data comprises:
expanding the initial foreground data, to obtain expanded foreground data;
eroding the expanded foreground data, to obtain eroded foreground data; and
re-expanding and blurring the eroded foreground data, to obtain the certain foreground data and the uncertain data.

17. The non-transitory computer-readable storage medium according to claim 16, wherein the re-expanding and blurring the eroded foreground data, to obtain the certain foreground data and the uncertain data comprises:
determining difference data between the re-expanded foreground data and the eroded foreground data;
blurring the difference data;
performing summation on the blurred difference data and the eroded foreground data, to obtain a summation result; and
determining data, in the summation result, that meets a foreground data screening condition as the certain foreground data, and determining data, in the summation result, that meets neither the foreground data screening condition nor a background data screening condition as the uncertain data.

18. The non-transitory computer-readable storage medium according to claim 15, wherein the plurality of operations further comprise:
obtaining a background image set, each background image having a unique background;
respectively constructing target images of the target object in the unique backgrounds of the background images according to the target foreground data; and
constructing a target image sample set based on the target images of the target object in the unique backgrounds.

19. The non-transitory computer-readable storage medium according to claim 18, wherein the plurality of operations further comprise:
   training a background segmentation model by using the target image sample set.

20. The non-transitory computer-readable storage medium according to claim 19, wherein the plurality of operations further comprise:
   acquiring a to-be-processed target image;
   separating foreground data and background data from the to-be-processed target image by using the background segmentation model; and
   separately rendering the foreground data and the background data of the to-be-processed target image.

* * * * *